(12) United States Patent
Cabib et al.

(10) Patent No.: US 9,876,968 B2
(45) Date of Patent: Jan. 23, 2018

(54) DRIFT CORRECTION METHOD FOR INFRARED IMAGING DEVICE

(71) Applicants: Dario Cabib, Timrat (IL); Moshe Lavi, Nofit (IL); Liviu Singher, Kiryat Tivon (IL)

(72) Inventors: Dario Cabib, Timrat (IL); Moshe Lavi, Nofit (IL); Liviu Singher, Kiryat Tivon (IL)

(73) Assignee: CI SYSTEMS (ISRAEL) LTD., Migdal Ha'Emek (IL)

( * ) Notice: Subject to any disclaimer, the term of this patent is extended or adjusted under 35 U.S.C. 154(b) by 125 days.

(21) Appl. No.: 14/949,906

(22) Filed: Nov. 24, 2015

(65) Prior Publication Data

US 2016/0165152 A1    Jun. 9, 2016

Related U.S. Application Data

(60) Provisional application No. 62/088,720, filed on Dec. 8, 2014.

(51) Int. Cl.
*H04N 5/33* (2006.01)
*G01J 5/52* (2006.01)
(Continued)

(52) U.S. Cl.
CPC ............. *H04N 5/33* (2013.01); *G01J 5/0014* (2013.01); *G01J 5/0803* (2013.01); *G01J 5/52* (2013.01); *H04N 5/2353* (2013.01); *H04N 5/357* (2013.01); *H04N 5/3655* (2013.01); *G01J 2005/0048* (2013.01); *G01J 2005/0077* (2013.01)

(58) Field of Classification Search
CPC ....................................................... H04N 5/33
See application file for complete search history.

(56) References Cited

U.S. PATENT DOCUMENTS 8,049,163 B1 * 11/2011 Granneman ............ G01J 5/522
250/252.1
8,124,936 B1    2/2012 Lagna
(Continued)

FOREIGN PATENT DOCUMENTS

EP    0973019 A1    1/2000

*Primary Examiner* — David Porta
*Assistant Examiner* — Jeremy S Valentiner
(74) *Attorney, Agent, or Firm* — Mark M. Friedman

(57) ABSTRACT

A method reduces drift induced by environment changes when imaging radiation from a scene in two wavelength bands. Scene radiation is focused by two wedge-shaped components through a lens onto a detector that includes three separate regions. The wedge-shaped components are positioned at a fixed distance from the lens. The radiation from the scene is imaged separately onto two of the detector regions through an f-number of less than approximately 1.5 to produce a first pixel signal. Imaged radiation on each of the two regions includes radiation in one respective wavelength band. Radiation from a radiation source is projected by at least one of the wedge-shaped components through the lens onto a third detector region to produce a second pixel signal. The first pixel signal is modified based on a predetermined function that defines a relationship between second pixel signal changes and first pixel signal changes induced by environment changes.

19 Claims, 9 Drawing Sheets

(51) Int. Cl.
  *H04N 5/357* (2011.01)
  *H04N 5/235* (2006.01)
  *H04N 5/365* (2011.01)
  *G01J 5/00* (2006.01)
  *G01J 5/08* (2006.01)

(56) References Cited

U.S. PATENT DOCUMENTS

| | | |
|---|---|---|
| 2001/0045516 A1 | 11/2001 | Emanuel et al. |
| 2004/0108564 A1 | 6/2004 | Mitra |
| 2004/0149907 A1* | 8/2004 | Vaidya ............... H04N 5/3651 250/336.1 |
| 2005/0263682 A1* | 12/2005 | Eikenberry ............ G01J 1/04 250/216 |
| 2008/0210872 A1* | 9/2008 | Grimberg ............. G01J 5/522 250/339.04 |
| 2008/0251724 A1 | 10/2008 | Baliga et al. |
| 2010/0019154 A1 | 1/2010 | Rafferty et al. |
| 2014/0231650 A1* | 8/2014 | Streuber ........... H01L 27/14625 250/349 |

\* cited by examiner

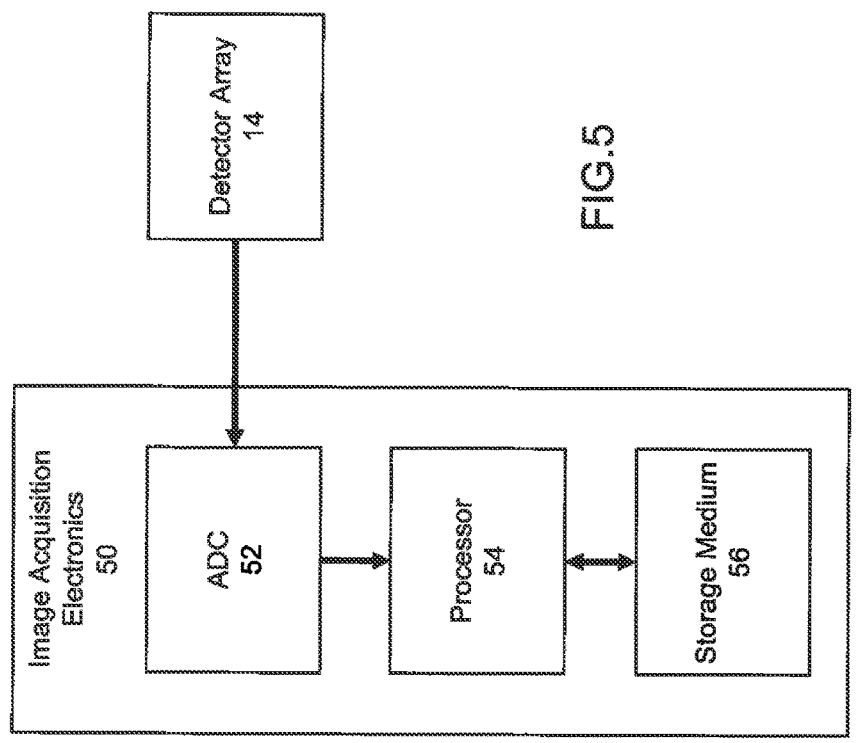
FIG. 5
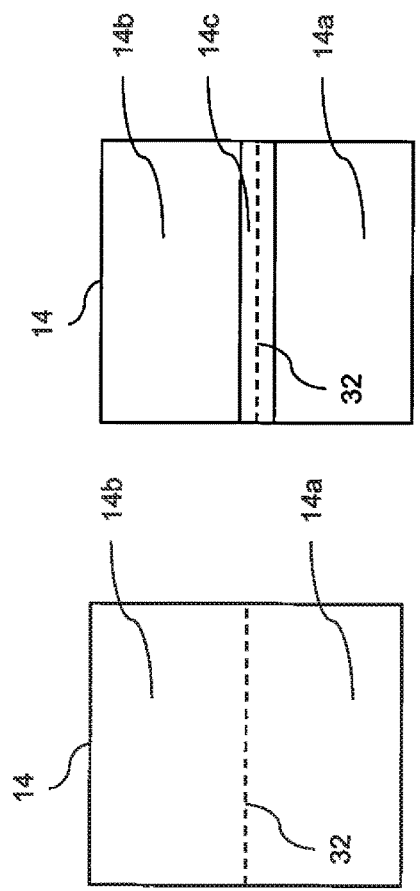
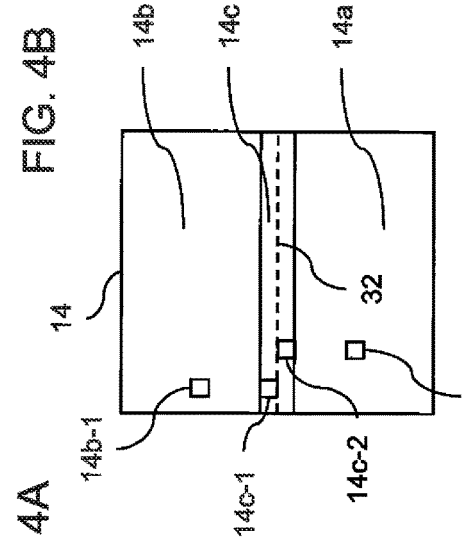

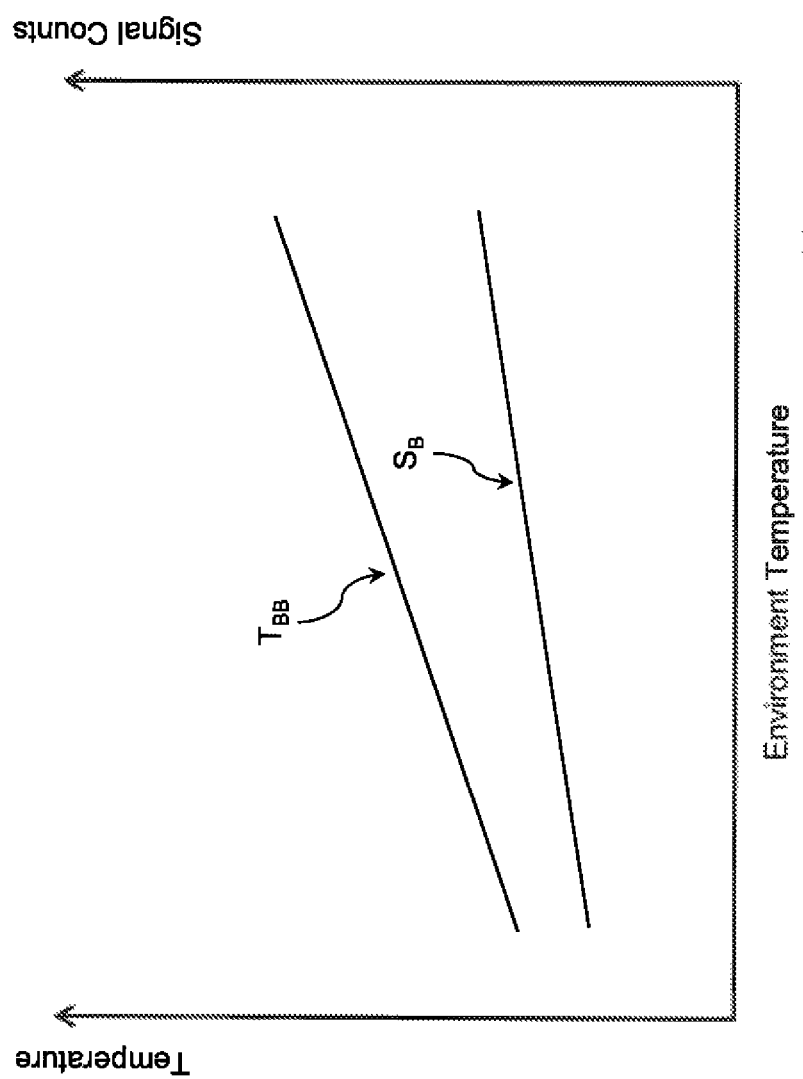

DRIFT CORRECTION METHOD FOR INFRARED IMAGING DEVICE

CROSS-REFERENCE TO RELATED APPLICATIONS

This application claims priority from U.S. Provisional Patent Application No. 62/088,720, filed Dec. 8, 2014, the entirety of which is incorporated herein by reference. This application is related to the commonly owned U.S. Patent Application entitled Dual Spectral Imager with No Moving Parts (U.S. patent application Ser. No. 14/949,909), filed on the same date as this application, the disclosure of which is incorporated by reference in its entirety herein.

TECHNICAL FIELD

The present invention relates to the detection and imaging of infrared radiation for gas cloud imaging and measurement.

BACKGROUND OF THE INVENTION

Infrared imaging devices based on uncooled microbolometer detectors can be used to quantitatively measure the radiance of each pixel of a scene only if the environment radiation changes (due mainly to environment temperature changes) contributing to the detector signals, can be monitored and corrected for. This is due to the fact that a quantitative measurement of infrared radiation from a scene is based on a mathematical relation between the detector signal and the radiation to be measured. This relation depends on the environment state during the measurement, and therefore the quantitative scene measurement can be done only if the environment state, and how the environment state affects that relation, is known during the measurement. The environment radiation sensed by the detector elements originates mainly from the optics and enclosures of the imaging device (besides the scene pixel to be monitored), and is a direct function of the environment temperature. If this radiation changes in time, it causes a drift in the signal, which changes its relation to the corresponding scene radiation to be measured and introduces inaccuracy.

This resulting inaccuracy prevents the use of such devices, especially in situations where they have to provide quantitative information on the gas to be monitored and have to be used unattended for monitoring purposes over extended periods of time, such as, for example, for the monitoring of a scene in industrial installations and facilities.

One known method for performing drift corrections is referred to as Non-Uniformity Correction (NUC). NUC corrects for detector electronic offset and partially corrects for detector case temperature drifts by the frequent use of an opening and closing shutter which is provided by the camera manufacturer. This NUC procedure is well known and widely employed in instruments based on microbolometer detectors. The shutter used for NUC is a moving part and therefore it is desirable to reduce the number of openings and closings of such a component when monitoring for gas leakages in large installations, requiring the instrument to be used twenty four hours a day for several years without maintenance or recalibration. Frequent opening and closing of the shutter (which is usually done every few minutes or hours) requires high maintenance expenses.

To reduce the amount of shutter operations when using NUC techniques, methods for correcting for signal drift due to detector case temperature changes occurring between successive shutter openings have been developed by detector manufacturers, referred to as blind pixel methods. Known blind pixel methods rely on several elements of the detector array of the imaging device being exposed only to a blackbody radiation source placed in the detector case, and not to the scene radiation (i.e. being blind to the scene). However, such methods can only account and compensate for environmental temperature changes originating near and from the enclosure of the detector array itself, and not for changes originating near the optics or the enclosures of the imaging device. This is because in general there are gradients of temperature between the detector case and the rest of the optics and device enclosure. Therefore, known blind pixel methods may not satisfactorily compensate for environment radiation changes in imaging devices with large and/or complex optics, such as, for example, optics with wedges for directing and imaging radiation onto a detector through an objective lens system, as described below.

SUMMARY OF THE INVENTION

The present invention is a method and device for providing a functionality for drift correction in an infrared dual band imaging system based on the optics described below, without the use of moving parts.

According to an embodiment of the teachings of the present invention there is provided, a method for reducing drift induced by a changing environment feature when imaging radiation from a scene, the radiation from the scene including at least a first and second wavelength band in the long wave infrared region of the electromagnetic spectrum, the method comprising: (a) focusing radiation from the scene by a first and second substantially wedge-shaped component through an image forming optical component onto a detector sensitive to radiation in the first and second wavelength bands, the detector being uncooled and including a separate first, second, and third detector region, the first and second wedge-shaped components positioned at a distance from the image forming optical component such that the radiation is imaged separately onto the first and second detector regions through an f-number less than approximately 1.5, and each of the wedge-shaped components transmitting radiation substantially in one respective wavelength band, and the imaged radiation on each of the first and second detector regions including radiation in one respective wavelength band, the imaged radiation on the first and second detector regions producing at least a first pixel signal; (b) projecting radiation from a radiation source by at least one of the first or second wedge-shaped components through the image forming optical component onto the third detector region to produce a second pixel signal, the radiation source different from the scene, and the radiation source projected continuously onto the third detector region over the duration for which the radiation from the scene is focused onto the first and second detector regions; and (c) modifying the first pixel signal based in part on a predetermined function to produce a modified pixel signal, the predetermined function defining a relationship between a change in the second pixel signal and change in the first pixel signal induced by the changing environment feature.

Optionally, the image forming optical component and the first and second wedge-shaped components are positioned within a first enclosure volume, and the method further comprises: (d) positioning the radiation source proximate to the first enclosure volume.

Optionally, the image forming optical component and the first and second wedge-shaped components are positioned within a first enclosure volume, and at least a portion of the first enclosure volume is positioned within a second enclosure volume, and the method further comprises: (d) positioning the radiation source within the second enclosure volume and outside of the first enclosure volume.

Optionally, the method further comprises: (d) determining the change in the first pixel signal induced by the changing environment feature based on the predetermined function, and the modified pixel signal is produced by subtracting the determined change in the first pixel signal from the first pixel signal.

Optionally, the predetermined function is a correlation between the second pixel signal and the change in the first pixel signal induced by the changing environment feature.

Optionally, the method further comprises: (d) determining the correlation, the determining of the correlation being performed prior to performing (a).

Optionally, the radiation source is a blackbody radiation source, and the detector and the first enclosure volume are positioned within a chamber having an adjustable chamber temperature, and a verification of the correlation is determined by: (i) measuring a first temperature of the blackbody radiation source at a first chamber temperature and measuring a subsequent temperature of the blackbody radiation source at a subsequent chamber temperature, the first and subsequent temperatures of the blackbody radiation source defining a first set; (ii) measuring a first reading of the second pixel signal at the first chamber temperature and measuring a subsequent reading of the second pixel signal at the subsequent chamber temperature, the first and subsequent readings of the pixel signal defining a second set; and (iii) verifying a correlation between the first and second sets.

Optionally, the radiation source is a blackbody radiation source, and the detector and the first enclosure volume are positioned within a chamber having an adjustable chamber temperature, and a determination of the correlation includes: (i) measuring a first reading of the first pixel signal at a first chamber temperature and measuring a subsequent reading of the first pixel signal at a subsequent chamber temperature; (ii) subtracting the first reading of the first pixel signal from the subsequent reading of the first pixel signal to define a first set; and (iii) measuring a first reading of the second pixel signal at the first chamber temperature and measuring a subsequent reading of the second pixel signal at the subsequent chamber temperature, the first and subsequent readings of the second pixel signal defining a second set.

Optionally, the modifying of the first pixel signal includes: (i) measuring a first reading of the first pixel signal at a first time instance and measuring a subsequent reading of the first pixel signal at a subsequent time instance; (ii) measuring a first reading of the second pixel signal at the first time instance and measuring a subsequent reading of the second pixel signal at the subsequent time instance; and (iii) subtracting the first reading of the blind pixel signal from the subsequent reading of the blind pixel signal to define a third set.

Optionally, the modifying of the first pixel signal further includes: (iv) modifying the subsequent reading of the first pixel signal based on the third set in accordance with a correlation between the first and second sets.

Optionally, the determination of the correlation further includes: (iv) displaying the first set as a function of the second set.

Optionally, the determination of the correlation further includes: (iv) displaying the first set as a function of a third set, the third set being defined by the first chamber temperature and the subsequent chamber temperature.

There is also provided according to an embodiment of the teachings of the present invention, a device for reducing a drift induced by a changing environment feature when imaging radiation from a scene, the radiation from the scene including at least a first and second wavelength band in the long wave infrared region of the electromagnetic spectrum, the device comprising: (a) a radiation source, the radiation source different from the scene; (b) a detector of the radiation from the scene and of radiation from the radiation source, the detector being uncooled and sensitive to radiation in the first and second wavelength bands, and the detector including a separate first, second, and third detector region; (c) a first and a second filter, the first filter associated with the first detector region for allowing radiation in the first wavelength band to be imaged on the first detector region, the second filter associated with the second detector region for allowing radiation in the second wavelength band to be imaged on the second detector region; (d) an optical system for continuously focusing the radiation from the scene and the radiation source onto the detector, the optical system comprising: (i) an image forming optical component for forming an image of the scene on the detector and for projecting radiation from the radiation source onto the third detector region, and (ii) a first and a second substantially wedge-shaped component, the first wedge-shaped component associated with the first filter, the second wedge-shaped component associated with the second filter, each of the wedge-shaped components fixedly positioned at a distance from the image forming optical component, each of the wedge-shaped components directing radiation from a field of view of the scene through the image forming optical component onto the detector, such that the radiation is imaged separately onto the first and second detector regions through an f-number of the optical system of less than approximately 1.5, the imaged radiation on each of the detector regions including radiation in one respective wavelength band, and at least one of the first or second wedge-shaped components projecting radiation from the radiation source through the image forming optical component onto the third detector region; and the device further comprising (e) electronic circuitry configured to: (i) produce at least a first pixel signal from the imaged radiation on the first and second detector regions; (ii) produce a second pixel signal from the radiation source projected by the optical system onto the third detector region, and (iii) modify the first pixel signal according to a predetermined function to produce a modified pixel signal, the predetermined function defining a relationship between a change in the second pixel signal and a change in the first pixel signal induced by the changing environment feature.

Optionally, the electronic circuitry is further configured to: (iv) determine the change in the first pixel signal induced by the changing environment feature based on the predetermined function; and (v) subtract the determined change in the first pixel signal from the first pixel signal.

Optionally, the radiation source is a blackbody radiation source.

Optionally, the radiation from the radiation source is directed by only one of the first and second wedge-shaped components through the image forming optical component onto the third detector region.

Optionally, the device further comprises: (f) a first enclosure volume, the optical system being positioned within the first enclosure volume.

Optionally, the radiation source is positioned proximate to the first enclosure volume.

Optionally, the device further comprises: (g) a second enclosure volume, at least a portion of the first enclosure volume being positioned within the second enclosure volume, and the radiation source being positioned within the second enclosure volume and outside of the first enclosure volume.

BRIEF DESCRIPTION OF THE DRAWINGS

The invention is herein described, by way of example only, with reference to the accompanying drawings, wherein:

FIG. 4A is a schematic front view illustrating a detector array of the device of FIG. 1;

FIG. 4B is a schematic front view illustrating a detector array of the device of FIG. 3;

FIG. 4C is a schematic front view illustrating blind pixels and imaged pixels according to an embodiment of the invention;

FIG. 5 is a block diagram of image acquisition electronics coupled to a detector array according to an embodiment of the invention;

FIGS. 9A and 9B show examples of plots used for performing steps of the flowchart of FIG. 6

DESCRIPTION OF THE PREFERRED EMBODIMENTS

The present invention is a method and device for providing a functionality for drift correction in an infrared dual band imaging system as described below, which does not use moving parts.

The principles and operation of the method and device according to the present invention may be better understood with reference to the drawings and the accompanying description.

The present invention is applicable to infrared imaging devices and systems for imaging a scene in two wavelength regions of the infrared spectral range, most preferably the Long-Wave Infrared (LWIR) region of the electromagnetic spectrum, by using a pair of stationary wedge-shaped optical components. The particular value of the present invention rests in providing a means to ensure quantitative results of a gas distribution in the scene, by compensating for signal drifts without using moving parts.

Figure 1:
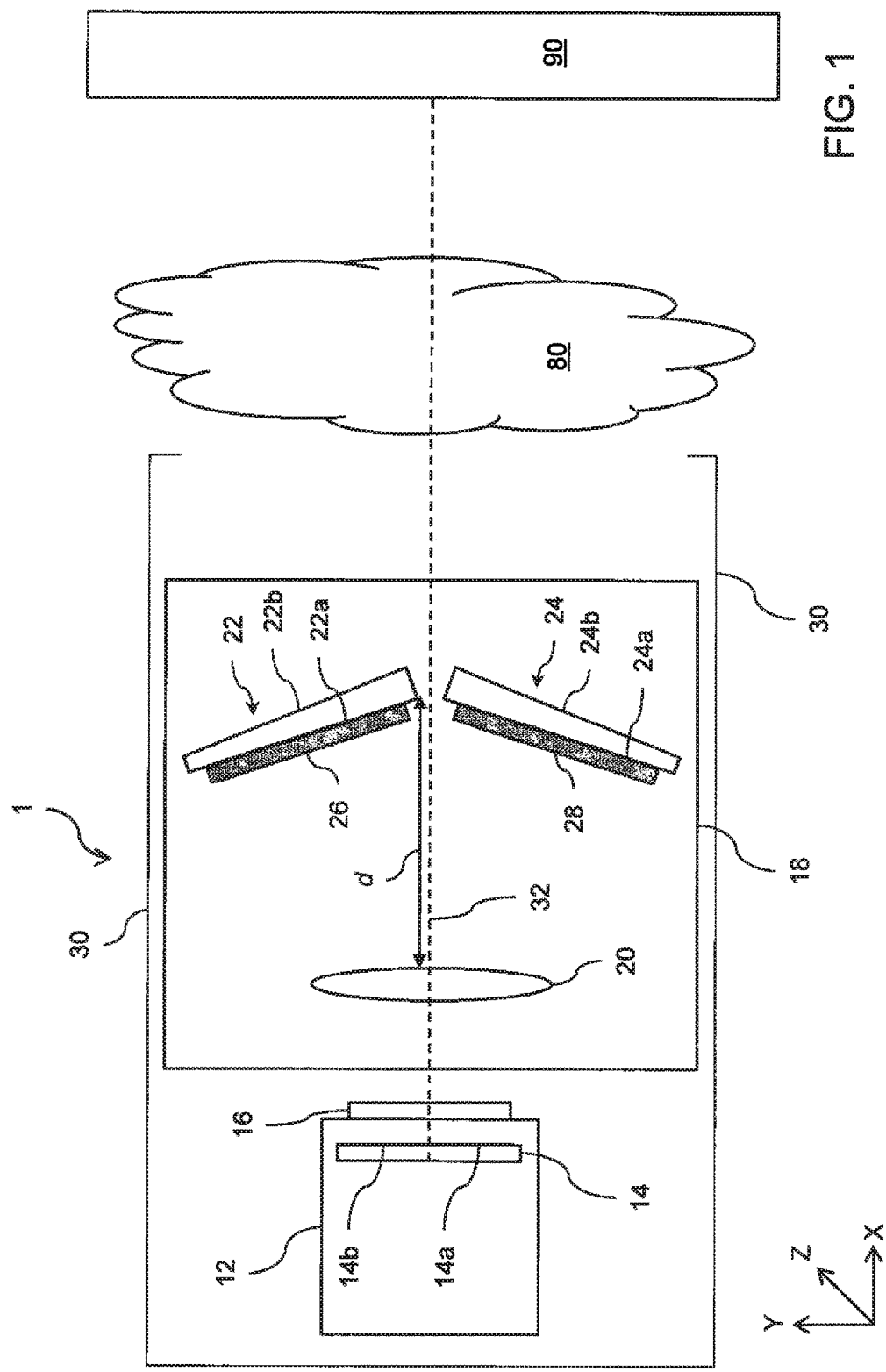
FIG. 1 is a schematic side view illustrating a device for imaging radiation from a scene in two wavelength regions with no moving parts.

With reference to the drawings, a schematic illustration of an example of such a device 1 for imaging radiation from a scene 80 is shown in FIG. 1. When imaging such a scene, the device 1 is positioned such that the scene 80 is interposed between the device 1 and a radiation emitting background 90, such as, for example, a collection of objects (such as pipes and walls), the horizon, the sky or any other suitable background. Infrared radiation in at least two wavelength bands, a first wavelength band $\lambda_G$ and a second wavelength band $\lambda_N$, is emitted from the background. The characteristics of the scene 80 are such that it is absorbent, at least in part, and emitting of radiation in one of the wavelength bands and non-absorbent (and therefore non-emitting) of radiation in the other wavelength band. For example, the scene 80 may be absorbent and emitting of radiation in the first wavelength band ($\lambda_G$) and non-absorbent and non-emitting of radiation in the second wavelength band ($\lambda_N$). As a result, data acquired through a filter approximately centered about $\lambda_G$ carries information about both the gas presence and the background emission. Similarly, data acquired through a filter approximately centered about $\lambda_N$ carries information about the background emission, but does not carry information about the gas presence. Special algorithms subsequently extract relevant gas cloud information from the acquired data in the two wavelength bands.

The imaging itself is done by an infrared detector array 14 that includes two separate regions, a first detector region 14a and a second detector region 14b. The detector array 14 is positioned within a detector case 12, in turn positioned within the device 1. Each of the detector regions includes a plurality of detector elements (not shown) corresponding to individual pixels of the imaged scene. Although the image acquisition electronics associated with the detector array 14 are not shown in FIG. 1, it should be understood that the image acquisition electronics includes electronic circuitry that produces corresponding imaged pixel signals for each pixel associated with a detector element. As a result of the radiation being imaged on a plurality of detector elements, the image acquisition electronics produces a plurality of imaged pixel signals.

The present invention specifically addresses systems based on an uncooled detector array 14 such as, for example, a microbolometer type array.

Radiation from the scene 80 and the background 90 is focused onto the detector array 14 through a window 16 by an optical system 18 whose optical components are represented symbolically in FIG. 1 by an objective lens 20 and first and second wedge-shaped components 22 and 24. Note that the "objective lens" 20 may actually be a set of one or more lenses that is represented in FIG. 1 by a single lens. The optical system 18 can be considered as a first enclosure volume for maintaining the position and the orientation of the optical components. The device 1 can be considered as a second enclosure volume, defined by internal walls 30, for maintaining the position and orientation of the optical system 18 and the detector array 14.

Figure 2:
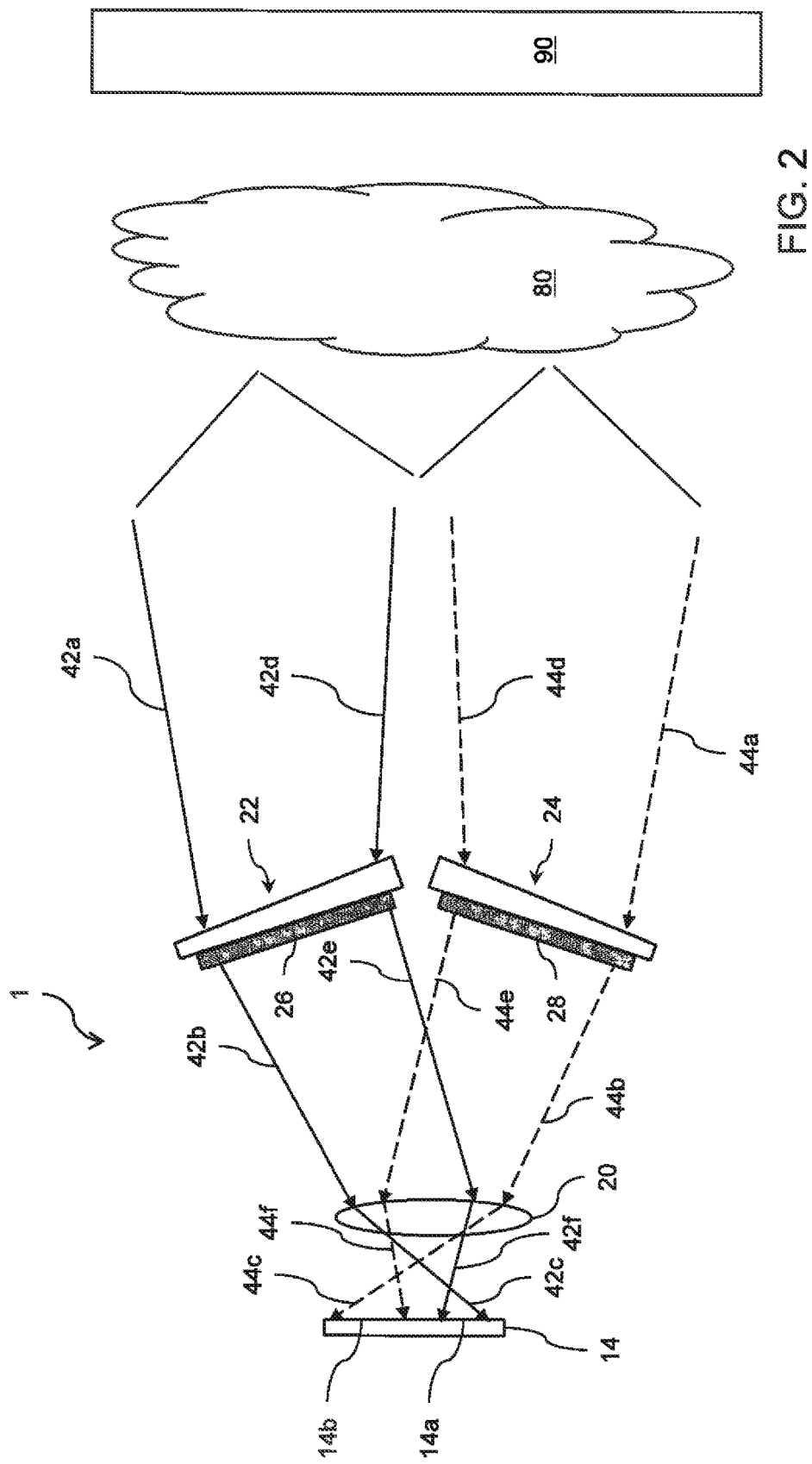
FIG. 2 is a schematic side view illustrating the traversal of incident rays from the scene through the device of FIG. 1.

The same infrared radiation from the scene 80 is imaged onto each of the two detector regions 14a and 14b, with each region of the detector imaging the scene 80 in a different wavelength band. The traversal of incident rays 42a-42f and 44a-44f from the scene 80 to the detector array 14 is shown in FIG. 2. The objective lens 20 focuses radiation deflected by the wedge-shaped components 22 and 24 on the detector array 14 to form two simultaneous and separate images of the scene 80 with the background 90, each image being formed on one half of the detector surface. As such, the radiation from the scene 80 and its background 90 is imaged separately and simultaneously onto the detector regions 14a and 14b.

The scene 80 and the background 90 is imaged by the device 1 with no moving parts while maintaining a high numerical aperture and low f-number (f/1.5 or less) at the detector array 14. This is accomplished by positioning each of the first and second wedge-shaped components 22 and 24 at a minimum fixed distance d from the objective lens 20 along the optical axis of the device 1. Positioning the wedge-shaped components 22 and 24 at a sufficiently large enough distance from the objective lens 20, in combination with the above mentioned deflection angles, allows for the low f-number (high numerical aperture) at the detector array 14 to be maintained. This corresponds to high optical throughput of the device 10. As a result, the same radiation from the scene is deflected by the wedge-shaped components 22 and 24 toward the objective lens 20 and imaged on the detector regions 14a and 14b through an f-number of the optical system 18 which can be maintained close to 1 (f/1) without having to decrease the focal length f or increase the aperture diameter D. Accordingly, the minimum distance d which provides such high optical throughput can be approximately lower bounded by:

$$d > \frac{D}{2\tan\left(\frac{\theta}{2}\right)} \quad (1)$$

Having a large numerical aperture (low f-number) provides higher sensitivity of the detector array 14 to the radiation from the scene 80, and less sensitivity to radiation originating from within the internal walls 30 of the device 1, the optical system 18, and the optical components themselves.

As a result of positioning the wedge-shaped components 22 and 24 at the distance d, the vertical fields of view of the wedge-shaped components 22 and 24 are approximately half of the above mentioned vertical field of view of the objective lens 20.

The wedge-shaped components 22 and 24 are preferably positioned symmetrically about the optical axis, such that each is positioned at the same distance d from the objective lens 20, and each is positioned at the same angle relative to the optical axis. Such a design ensures that the same amount of radiation is imaged on the detector regions 14a and 14b via the objective lens 20 from the wedge-shaped components 22 and 24.

As previously mentioned, the radiation from the scene 80 which is imaged onto the first detector region 14a only includes one of the wavelength bands. The radiation from the scene 80 which is imaged onto the second detector region 14b only includes the other one of the wavelength bands. This is accomplished by positioning filters 26 and 28, most preferably band pass filters, in the optical train.

Suppose, for example, that it is desired that the radiation from the scene 80 imaged on the first detector region 14a only includes radiation in the first wavelength band ($\lambda_G$), and the radiation from the scene 80 imaged on the second detector region 14b only includes radiation in the second wavelength band ($\lambda_N$). Accordingly, the first filter 26 filters radiation in spectral ranges outside of the first wavelength band ($\lambda_G$) and the second filter 28 filters radiation in spectral ranges outside of the second wavelength band ($\lambda_N$). Thus, the radiation from the scene 80 that is directed by the first wedge-shaped component 22 to be imaged on the first detector region 14a includes only radiation in the first wavelength band ($\lambda_G$), and the radiation from the scene 80 that is directed by the second wedge-shaped component 24 to be imaged on the second detector region 14b includes only radiation in the second wavelength band ($\lambda_N$).

The surface of the detector array 14 is divided into the two aforementioned regions by a dividing line 32 as shown in FIG. 4A. FIG. 1 includes a non-limiting exemplary representation of the Cartesian coordinate system XYZ in which the detector plane is parallel to the YZ plane. Accordingly, the dividing line 32 is parallel to the Z axis and the optical axis is parallel to the X-axis. The wedge-shaped components 22 and 24 are wedge-shaped in the XY plane.

As previously discussed, the large numerical aperture and low f-number provides higher sensitivity of the detector array 14 to the radiation from the scene 80. However, changes in the environmental temperature surrounding the device 1 causes the emission of radiation originating from within the internal walls 30 of the imaging device 1, the optical system 18, and the optical components themselves to vary with time, which in turn leads to drifts in the imaged pixels signals, and erroneous results in the gas path concentration of each pixel of the image of the scene as measured by the device 1 according to appropriate algorithms.

Figure 3:
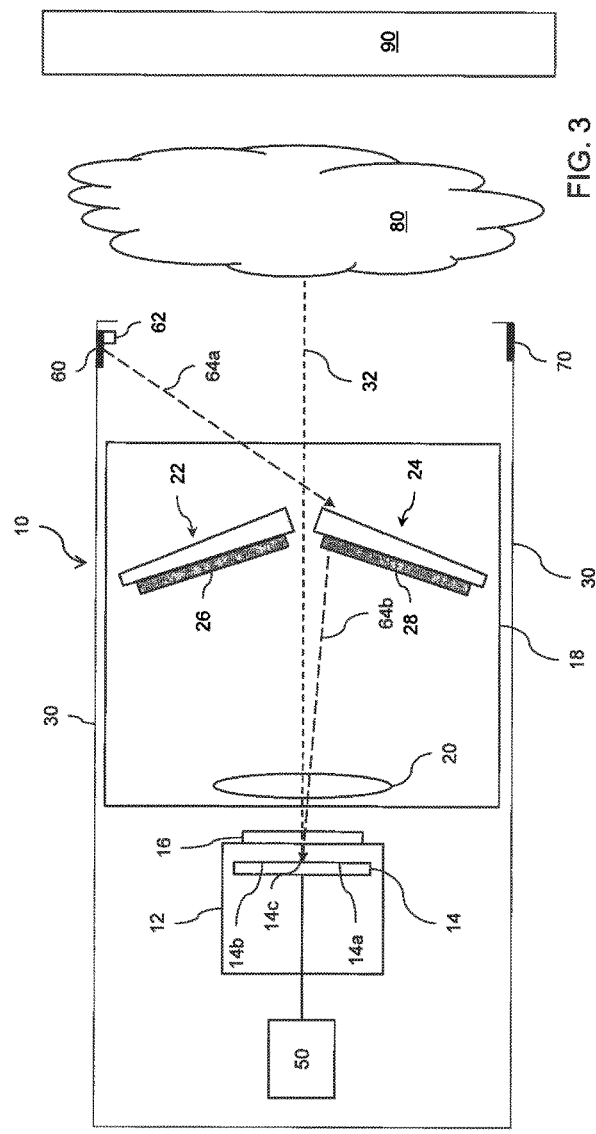
FIG. 3 is a schematic side view illustrating a device for drift correction according to an embodiment of the invention.

Refer now to FIG. 3, a device 10 for reducing the effect of the unwanted radiation according to an embodiment of the present disclosure. The description of the structure and operation of the device 10 is generally similar to that of the device 1 unless expressly stated otherwise, and will be understood by analogy thereto. Ideally, the device 10 reduces the signal drift to a negligible amount essentially correcting for the effect of the drift. Accordingly, the terms "correcting for", "compensating for" and "reducing", when applied to drift in imaged pixels signals, are used interchangeably herein.

For simplicity and disambiguation, the device 10 is hereinafter referred to as the imaging device 10. The term "imaging device" is used herein to avoid confusing the device 1 with the imaging device 10, and is not intended to limit the functionality of the imaging device 10 solely to imaging. The imaging device 10 may also include functionality for detection, measurement, identification and other operations relevant to infrared radiation emanating from a scene.

A specific feature of the imaging device 10 which is not shown in the device 1 is image acquisition electronics 50 associated with the detector array 14. As shown in FIG. 3, the image acquisition electronics 50 is electrically coupled to the detector array 14 for processing output from the detector in order to generate and record signals corresponding to the detector elements for imaging the scene 80. As will be discussed, the image acquisition electronics 50 is further configured to apply a correction to the generated scene pixels signals in order to reduce the drift in the generated scene pixels signals caused by the radiation originating from within the internal walls 30 of the imaging device 10, the optical system 18, and the optical components themselves.

Refer now to FIG. 5, a block diagram of the image acquisition electronics 50. The image acquisition electronics 50 preferably includes an analog to digital conversion module (ADC) 52 electrically coupled to a processor 54. The processor 54 is coupled to a storage medium 56, such as a memory or the like. The ADC 52 converts analog voltage signals from the detector elements into digital signals. The processor 54 is configured to perform computations and algorithms based on the digital signals received from the ADC 52.

The processor 54 can be any number of computer processors including, but not limited to, a microprocessor, an ASIC, a DSP, a state machine, and a microcontroller. Such processors include, or may be in communication with computer readable media, which stores program code or instruction sets that, when executed by the processor, cause the processor to perform actions. Types of computer readable media include, but are not limited to, electronic, optical, magnetic, or other storage or transmission devices capable of providing a processor with computer readable instructions.

As shown in FIG. 3, the image acquisition electronics 50 may be positioned outside of the detector case 12. Alternatively, the image acquisition electronics 50 may be included as part of the detector array 14 and detector case 12 combination.

Another specific feature of the imaging device 10 that is different from the device 1 is the partition of the detector array 14 into separate regions. As shown in FIG. 4B, the detector array 14 of the imaging device 10 is partitioned into three separate regions, a first detector region 14a, a second detector region 14b, and a third detector region 14c. The area of the third detector region 14c is significantly smaller or not usually larger than the areas of the other two detector regions and can be visualized as a strip extending across the center of the detector plane along the Z-axis.

The optical system composed of the wedge-shaped components 22 and 24, and the objective lens 20 simultaneously images the scene 80 upside down in both regions 14a and 14b while projecting infrared radiation emitted by a surface 60 (e.g. a blackbody radiation source) onto the third detector region 14c. The surface 60 is in good thermal contact with the internal walls 30 of the device and is in the vicinity of the optical components, so that the temperature of the surface 60 can be assumed to be at all times at the temperature of the internal walls 30 and optical system 18, which in turn is affected by (and usually, especially when used in outdoor conditions, close to) the environment temperature. In other words, the signals of the detector elements of the third detector region 14c do not carry information from the scene 80, but rather carry information on the self-emitted radiation of the internal walls 30 and optical system 18 of the device. Therefore, the pixels signals of the third detector region 14c can be used by the device 10 algorithms and electronics to correct for the unwanted changes to the signals of the detector regions 14a and 14b that are caused by changing environment and not by the corresponding regions of scene 80. The pixels of the third detector region 14c are referred to as "blind pixels". Additionally, a baffle or baffles may be positioned to prevent radiation from the scene 80 from reaching the third detector region 14c.

The above explanation constitutes a third specific feature of the imaging device 10, which is different from the device 1, namely the inclusion of the blackbody radiation source 60 within the internal walls 30 of the imaging device 10. The blackbody radiation source 60 is positioned such that the blackbody radiation source 60 emits radiation which is projected only onto the third detector region 14c, resulting in the blind pixels as previously mentioned to produce signals which, as will be discussed in more detail below, are used to reduce the drift in the signals from the scene, due to changing case and optics self-emission. The traversal of incident rays 64a and 64b from the blackbody radiation source 60 to the detector array 14 is shown in FIG. 3. Note that the traversal of the rays as depicted in FIG. 3 is not drawn to scale (due to drawings space constraints), and that the deflection angle between the rays 64a and 64b is approximately the same as the deflection angle between the rays 44d and 44e (FIG. 2).

The blackbody radiation source 60 can be placed in various positions within the imaging device 10. Preferably, the blackbody radiation source 60 is placed in contact with the internal walls 30 of the imaging device 10 and outside of the optical system 18, and most preferably in proximity to the optical system 18. The placement of the blackbody radiation source 60 within the imaging device 10 is incumbent upon the radiation being focused by the optical system 18 onto only the third detector region 14c to generate the blind pixels signals.

In the non-limiting implementation of the imaging device 10 shown in FIG. 3, the blackbody radiation source 60 is positioned such that the radiation from the blackbody radiation source 60 is directed by the second wedge-shaped component 24 through the objective lens 20 onto the third detector region 14c. Note that in addition to the blackbody radiation source 60, an additional blackbody radiation source 70 can be placed in a symmetric position about the X-axis such that the radiation from the blackbody radiation source 70 is directed by the first wedge-shaped component 22 through the objective lens 20 onto the third detector region 14c as well.

The process of reducing and/or correcting for the drift in the generated scene pixels signals is applied to all scene pixels signals. For clarity, the process will be explained with reference to correcting for the drift in a single scene pixel signal.

The optical components, the optical system 18, and the spaces between the internal walls 30 are assumed to be at a temperature $T_E$, which is usually close to and affected by the temperature of the environment in which the imaging device 10 operates. As a result, the amount of radiation originating from the optical components and the optical system 18 is a direct function of the temperature $T_E$.

Since the blackbody radiation source 60 (and 70 if present) is placed within the imaging device 10 and in good thermal contact with the device 10, the optical system 18 and the internal walls 30, the temperature of the blackbody radiation source 60 ($T_{BB}$) is assumed to be the same or a function of the temperature $T_E$ (i.e. $T_{BB}$ and $T_E$ are correlated). $T_{BB}$ can be measured by a temperature probe 62 placed in proximity to, or within, the blackbody radiation source 60.

A measured scene pixel signal S from a region of the scene, can be expressed as the sum of two signal terms, a first signal term $S_O$, and a second signal term $S_S$. The first signal term $S_O$ is the signal contribution to S corresponding to the radiation originating from the optical components, the optical system 18, and internal walls 30 of the device 10. The second signal term $S_S$ is the signal contribution to S due to the radiation originating from the corresponding region of the scene 80 imaged on the pixel in question. Accordingly, the scene pixel signal S is the result of the combination of radiation originating from the internal walls 30 and environment, optical components and the optical system 18, and radiation from the scene 80, being imaged onto the two detector regions 14a and 14b.

Since the blackbody radiation source 60 is assumed to be at a temperature that is a direct function of the temperature $T_E$, the radiation emitted by the blackbody radiation source 60 is representative of the radiation originating from the optical components and the optical system 18 and internal walls 30 and environment. Accordingly, a blind pixel signal, $S_B$, may be assumed to be also a good representation of the contribution to the scene pixel signal due to the radiation originating from the environment, the optical components and the optical system 18.

As a result of the radiation originating from the optical components and the optical system 18 being a direct function of the temperature $T_E$, the first signal term $S_O$ (if the above assumptions are correct) is also a direct function of the temperature $T_E$. This can be expressed mathematically as $S_O=f_1(T_E)$, where $f_1(*)$ is a function.

Similarly, as a result of the blind pixel signal $S_B$ being assumed to be a good representation of the pixel signal contribution corresponding to the radiation originating from the optical components and the optical system 18, the blind pixel signal $S_B$ can also be assumed to be a direct function of the internal walls 30, the environment and optical system temperature $T_E$. This can be expressed mathematically as $S_B=f_2(T_E)$, where $f_2(*)$ is also a function.

Accordingly, since both the first signal term $S_O$ and the blind pixel signal $S_B$ are functions of the same operating temperature $T_E$, it is conceivable that a correlation may exist between the first signal term $S_O$ and the blind pixel signal $S_B$. With the knowledge of the correlation (if existing), the first signal term $S_O$ and the changes in time of $S_O$ (referred to hereinafter as "scene pixel signal drifts") can be determined from the blind pixel signal $S_B$ and the changes in time of $S_B$. Accordingly, in the above assumptions, the changes in time or drifts of the scene pixel signal S due to environment status can be removed and corrected for, in order to prevent gas quantity calculation errors.

In the context of this document, the term "correlation", when applied to a relationship between sets of variables or entities, generally refers to a one-to-one relationship between the sets of variables. As such, a correlation between the first signal term $S_O$ and the blind pixel signal $S_B$ indicates a one-to-one relationship between the first signal term $S_O$ and the blind pixel signal $S_B$ at any temperature of the imaging device 10. This correlation is determined by a sequence of controlled measurements. The sequence of controlled measurements is performed prior to when the imaging device 10 is in operation in the field, and can be considered as a calibration procedure or process to be performed in manufacturing of the device. For the purposes of this document, the imaging device 10 is considered to be in an operational stage when the radiation from the scene 80 is imaged by the detector array 14 and the drift in the generated imaged pixels signals is actively reduced by the techniques as will later be described.

Recall the assumption that the blackbody radiation source 60 is at a temperature that is a direct function of the temperature $T_E$. According to this assumption, the blind pixel signal $S_B$ is assumed to be a good representation of the pixel signal contribution due to the radiation originating from the optical components and the optical system 18. Prior to determining the correlation function between the first signal term $S_O$ and the blind pixel signal $S_B$, it is first necessary to verify the actuality of the above assumptions. Subsequent to the verification, the correlation function between the time changes of the first signal term $S_O$ (scene pixel signal drifts) and the blind pixel signal $S_B$ time changes can be determined. Both the verification process, and the process of determining the correlation function, is typically conducted through experiment. In practice, only drifts, or unwanted changes of the imaged pixel signals over time are to be corrected for, so the process of verification and determination of the correlations are only needed and performed between the differentials of $S_O$, $S_B$, or variations during time due to environment temperature variations.

Figure 6:
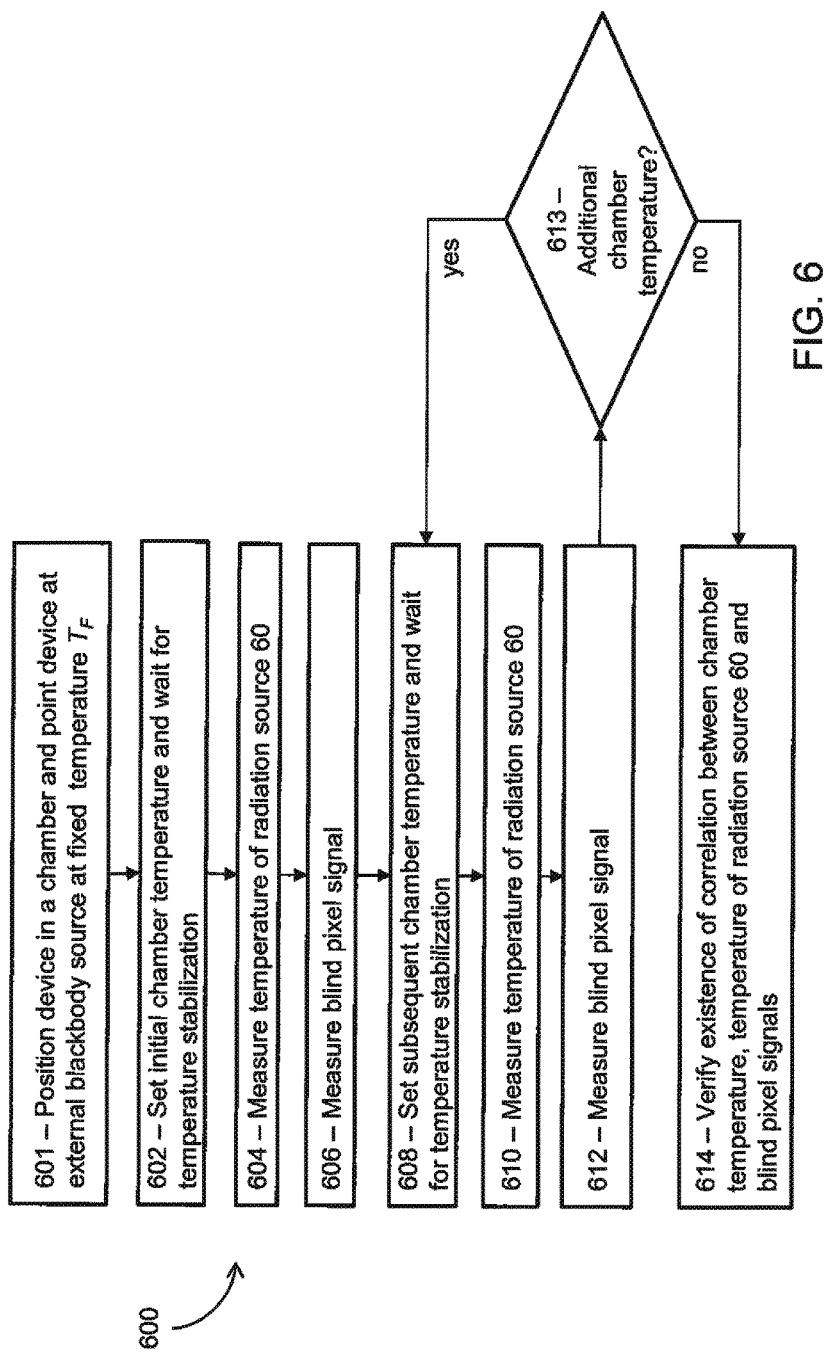
FIG. 6 is a flowchart for verifying a correlation according to an embodiment of the invention.

Refer now to FIG. 6, a flowchart of a process 600 for verifying the existence of a correlation between the environment temperature, the temperature of the blackbody radiation source 60 (and 70 if present) and the blind pixel signal $S_B$. In step 601, the imaging device 10 is placed in a temperature controlled environment, such as a temperature chamber having a controllable and adjustable temperature, and to point the device 10 at an external blackbody source at a fixed temperature $T_F$ so that the scene pixels of the detector regions 14a and 14b are exposed to unchanging radiation from the external blackbody. Such an external blackbody source is used in place of the scene 80 depicted in FIGS. 2 and 3. In step 602, the temperature of the temperature chamber is set to an initial temperature $T_0$. The temperature of the temperature chamber and the imaging device 10 are let to stabilize to temperatures $T_0$ and $T_E$ respectively by allowing for an appropriate interval of time to pass.

Once the temperatures have stabilized, $T_{BB}$ (which may be practically equal to $T_E$) is measured via the temperature probe 62 in step 604. In step 606, the blind pixel signal $S_B$ is measured via the image acquisition electronics 50. Accordingly, the blind pixel signal $S_B$ and $T_{BB}$ are measured at temperature $T_0$ in steps 604 and 606, respectively.

In step 608, the temperature of the temperature chamber is set to a different temperature $T_1$. Similar to step 602, the temperatures of the temperature chamber and the imaging device 10 are let to stabilize to temperature $T_1$ and a new temperature $T_E$, respectively, by allowing for an appropriate interval of time to pass. Once the temperatures have stabilized, $T_{BB}$ is measured via the temperature probe 62 in step 610. In step 612, the blind pixel signal $S_B$ is measured via the image acquisition electronics 50. Accordingly, the blind pixel signal $S_B$ and $T_{BB}$ are measured at chamber temperature $T_1$ in steps 610 and 612, respectively.

The process may continue over a range of chamber temperatures of interest, shown by the decision step 613. For each selected chamber temperature, the blind pixel signal $S_B$ and $T_{BB}$ and $T_E$ are measured as in steps 604, 606, 610 and 612 above.

In step 614, the existence of a correlation between the environment temperature, the blind pixel signal $S_B$ and the temperature of the blackbody radiation source 60 (and 70 if present) is verified by analyzing the resultant measurements. For example, the blind pixel signal $S_B$ measurements from steps 604 and 610 can be plotted as function of the operating temperatures $T_E$ established in steps 602 and 608. Similarly, the $T_{BB}$ measurements from steps 606 and 612 can be plotted or otherwise visualized versus the range of operating temperatures $T_E$ established in steps 602 and 608. An example of plots for executing step 614 is depicted in FIGS. 9A and 9B.

Figure 9A:
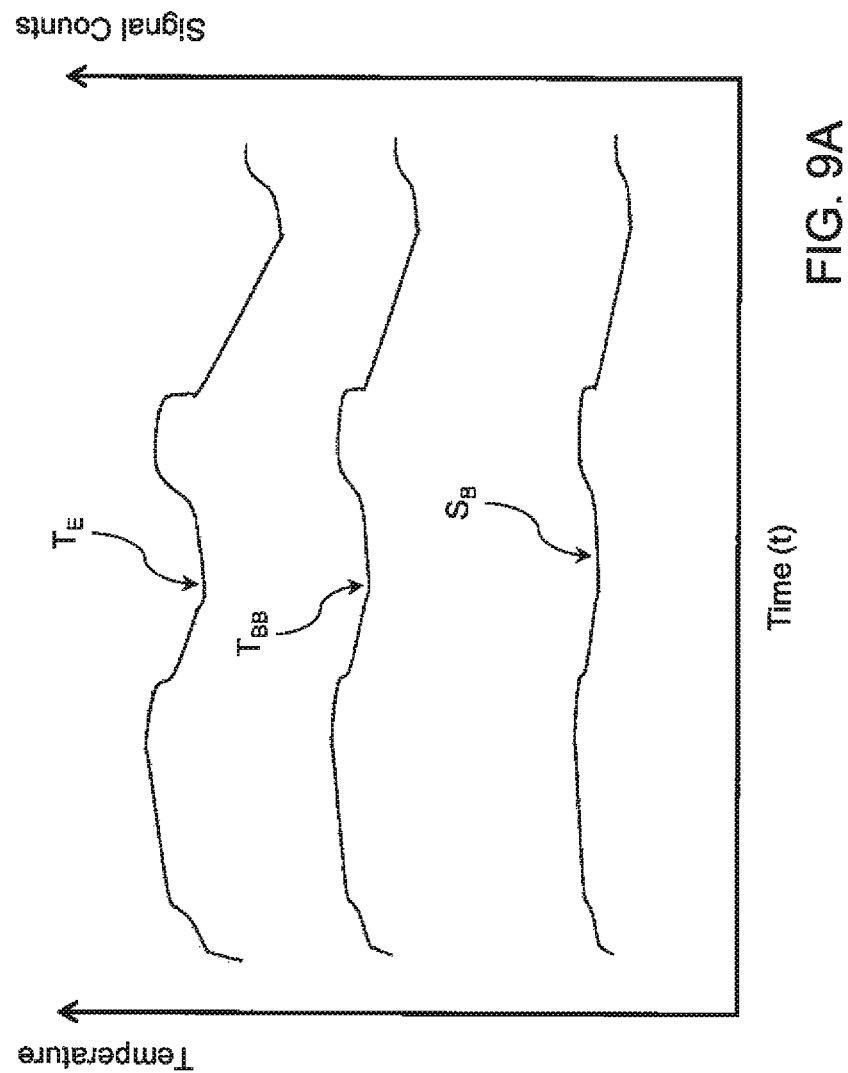

Referring first to FIG. 9A, an example of plots of the measurements of the operating temperatures ($T_E$), the blind pixel signal ($S_B$), and the blackbody radiation source temperature ($T_{BB}$ measured via the temperature probe 62) is depicted. The plots shown in FIG. 9A are intended to serve as illustrative examples, and should not be taken as limiting in the scope or implementation of the process 600.

Note that the x-axis in FIG. 9A is designated as "time (t)", as should be apparent due to the variation of the operating temperatures ($T_E$) as time (t) goes by. Also note that the example plots shown in FIG. 9A includes two y-axes. The first y-axis (shown on the left side of FIG. 9A) is designated as "temperature" and corresponds to the operating temperatures ($T_E$) and the blackbody radiation source temperature ($T_{BB}$). The second y-axis (shown on the right side of FIG. 9A), is designated as "signal counts" and is the measured output of the ADC 52 corresponding to the blind pixel signal ($S_B$).

If there is a linear (or any other one-to-one) relationship between the three entities $T_E$, $T_{BB}$, and $S_B$, the above discussed assumptions are upheld to be valid, and therefore there exists a correlation between the temperatures $T_E$, $T_{BB}$, and the blind pixel signal $S_B$.

Referring now to FIG. 9B, the recognition of such a linear relationship can be shown by alternatively plotting the measurements depicted in FIG. 9A. As should be apparent, the example plots shown in FIG. 9B show the blackbody radiation source temperature ($T_{BB}$) and the blind pixel signal ($S_B$) signal counts versus the temperature $T_E$, which, as previously discussed, is the environment temperature. Accordingly, the x-axis in FIG. 9B is designated as "environment temperature". As in FIG. 9A, FIG. 9B also includes two y-axes. The first y-axis (shown on the left side of FIG. 9B) is designated as "temperature" and corresponds to the blackbody radiation source temperature ($T_{BB}$). The second y-axis (shown on the right side of FIG. 9B), is designated as "signal counts" and is the measured output of the ADC 52 corresponding to the blind pixel signal ($S_B$).

Similar to the plots shown in FIG. 9A, the plots shown in FIG. 9B are intended to serve as illustrative examples, and should not be taken as limiting in the scope or implementation of the process 600. As can be clearly seen in the illustrative example depicted in FIG. 9B, a linear relationship of non-zero slope (which is an example of a one-to-one relationship) exists between the three entities $T_E$, $T_{BB}$, and $S_B$, thus implying that the three entities are correlated.

Figure 7:
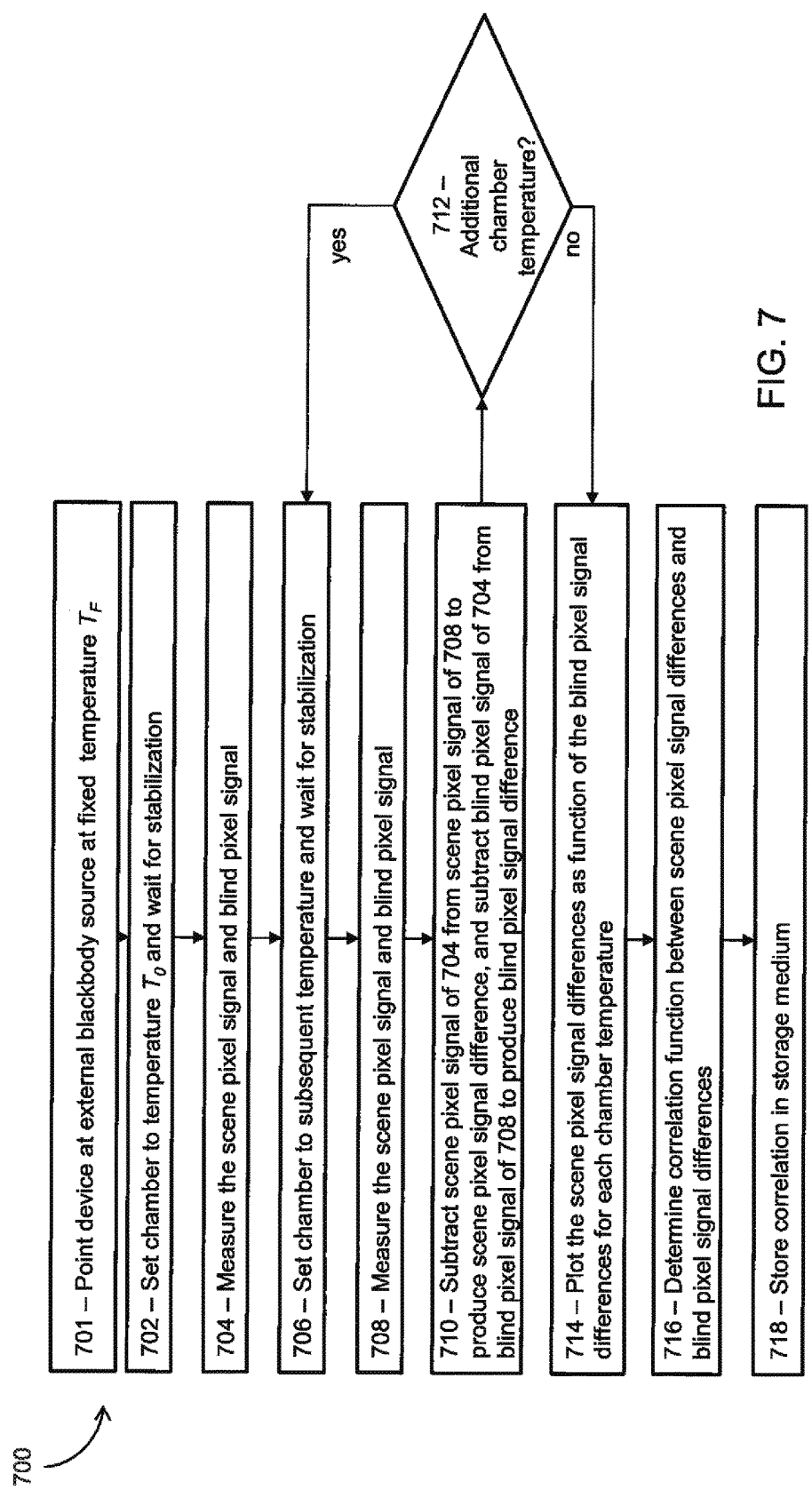
FIG. 7 is a flowchart for determining a correlation according to an embodiment of the invention.

Refer now to FIG. 7, a flowchart of a process 700 for determining a correlation between the drifts of scene pixels signals and the blind pixel signals $S_B$ changes due to changes in environment temperature. Similar to the process 600, before performing the process 700, the imaging device 10 is placed in the temperature chamber. The imaging device 10 is also pointed at a source of infrared radiation representing and simulating a scene during the operation of the device 10, most conveniently a blackbody source at a known and fixed temperature. The blackbody may be positioned inside the temperature chamber or outside of the temperature chamber and measured by the imaging device 10 through an infrared transparent window. In the process 700, measurements of the scene pixel signal S and the blind pixel signal $S_B$ are made via the image acquisition electronics 50.

In step 701 (similar to step 601 above), the device 10 is retained in the temperature chamber and pointed at the external blackbody source which is set to a fixed temperature $T_F$. In step 702, the temperature of the temperature chamber is set to an initial temperature $T_0$. The chamber and the device 10 are let to stabilize at temperature $T_0$ by waiting an appropriate period of time. In step 704, the imaged pixel signal S and the blind pixel signal $S_B$ are measured after the temperature of the imaging device 10 reaches stabilization at $T_0$.

In step 706, the temperature of the temperature chamber is set to a new temperature $T_1$, and the external blackbody is maintained at the temperature T. The chamber and the device 10 are let to stabilize at temperature $T_1$ by waiting an appropriate period of time. In step 708, the scene pixel signal S and the blind pixel signal $S_B$ are measured after the temperature of the imaging device 10 reaches stabilization at $T_1$.

In step 710, the imaged pixel signal S measured in step 704 is subtracted from the imaged pixel signal S measured in step 708. The result of step 710 yields the temporal drift of the imaged pixel signal due to the change in the temperature of the temperature chamber. Also in step 710, the blind pixel signal $S_B$ measured in step 704 is subtracted from the blind pixel signal $S_B$ measured in step 708.

Similar to the process 600, the process 700 may continue over a range of chamber temperatures of interest, shown by decision step 712. For each selected chamber temperature, the imaged pixel signal S measured in step 704 is subtracted from the imaged pixel signal S measured at the selected temperature, and the blind pixel signal $S_B$ measured at step 704 is subtracted from the blind pixel signal $S_B$ measured at the selected temperature. This procedure can be performed for all the operating temperature ranges of the imaging device.

In step 714, the resultant differences in the scene pixels obtained in step 710 are plotted as function of the blind pixel differences obtained at each chamber temperature. In step 716, the correlation function is determined by analyzing the results of the plot obtained in step 714. Numerical methods, such as, for example, curve-fitting, least-squares, or other suitable methods, can be used to further facilitate the determination of the correlation function.

As should be apparent, the resulting correlation function can be interpolated and extrapolated to cover operating temperature ranges not measured during the execution of the processes 600 and 700. In step 718, the correlation function determined in step 716 is stored in a memory coupled to the processor 54, such as, for example, the storage medium 56.

Note that typical environment temperature variations used during the execution of the processes 600 and 700 may depend on various factors such as, for example, the location of the imaging device 10 when in the operational stage and the intended specific use of the imaging device 10 when in the operational stage. For example, when the imaging device 10 is used for monitoring in industrial installations and facilities for gas leakages, the temperature variations occurring during the execution of the processes 600 and 700 are typically in the range of tens of degrees.

As a result of the correlation function determined by the process 700, during the operation of the imaging device 10, signal drifts of the measured scene pixel signals can be compensated in real time while the temperature of the environment changes. The process of compensating and/or correcting for the signal drifts during operation of the imaging device 10 is detailed in FIG. 8.

Figure 8:
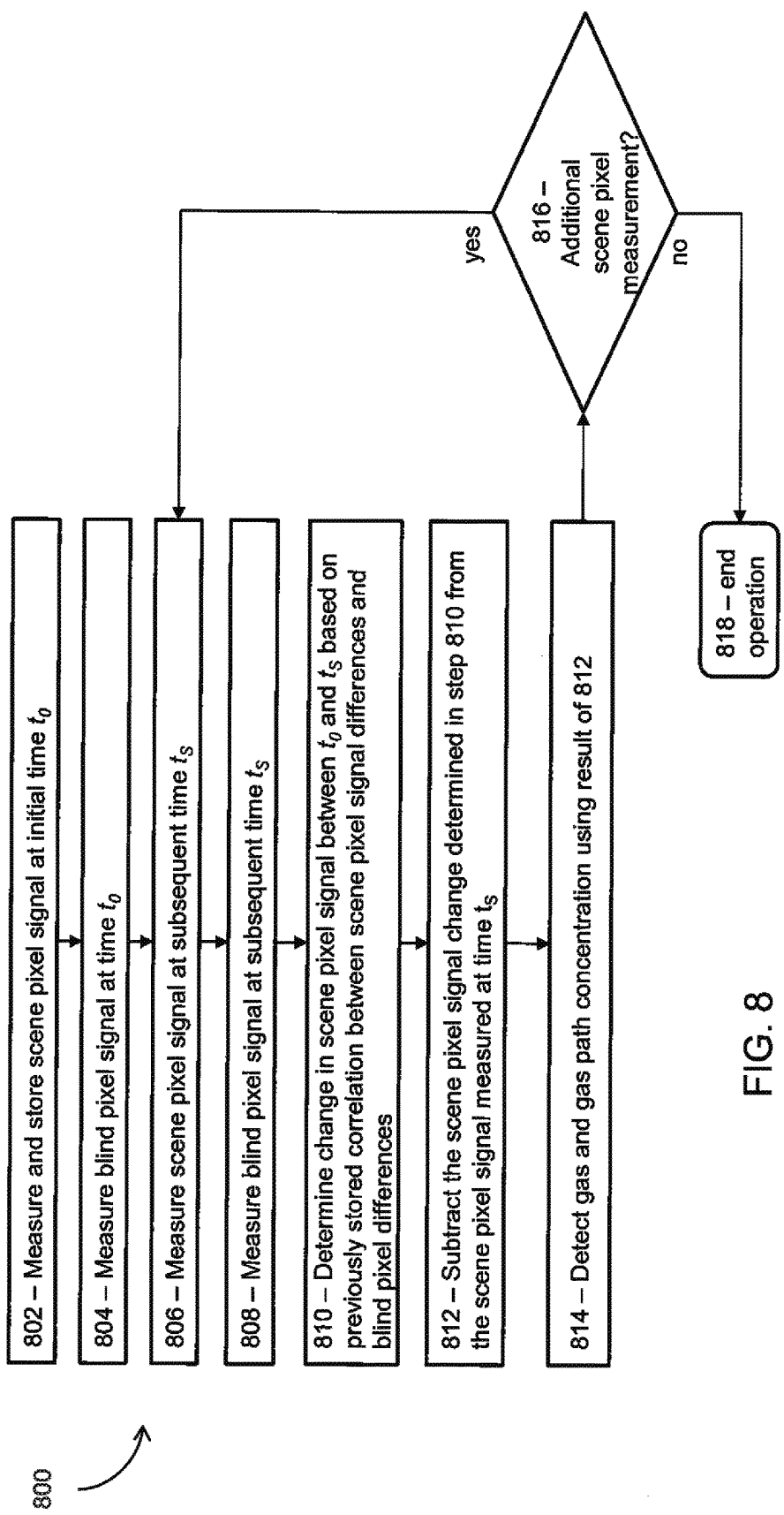
FIG. 8 is flowchart for correcting for drift according to an embodiment of the invention.

Refer now to FIG. 8, a flowchart of a process 800 for correcting for the signal drifts in the imaged pixel signal S caused by environment temperature changes, while the device 10 is operational in the field. In steps 802-814 the device 10 is operational in the field and monitors a scene in an industrial environment, automatically and without human intervention.

In step 802, the scene pixel signal S is measured and stored at an initial time $t_0$. The scene pixel measured at time $t_0$ may be stored in the storage medium 56 or stored in a temporary memory coupled to the processor 54. In step 804, the blind pixel signal $S_B$ is measured at the same initial time $t_0$. In step 806, the scene pixel signal S is measured at a subsequent time $t_S$ after the initial time $t_0$. In step 808, the blind pixel signal $S_B$ is measured at the same subsequent time $t_S$.

In step 810, the blind pixel signal $S_B$ measured in step 804 is subtracted from the blind pixel signal $S_B$ measured in step 808. In step 810, the drift of scene pixel signal that occurred between the measurement time $t_0$ and $t_S$ (due to change in the environment temperature) is determined from the correlation function of signal differences determined and stored in the procedure 700. The determination of the drift of scene pixel signal in step 810 is accomplished by subtracting the blind pixel signal measured in step 804 from the blind pixel signal measured in step 808. The resultant difference in blind pixel signal measurements is substituted into the correlation function of signal differences determined in the procedure 700 to determine the drift of scene pixel signal.

In step 812, the scene pixel signal S measured at step 806 is modified by subtracting from it the drift value determined in step 810.

In step 814, the scene pixel signal modified in step 812 is used to assess the presence or absence of the gas of interest in the corresponding scene region, and to calculate the gas path concentration if the gas is present. As should be apparent, steps 806-814 can be repeated, as needed, for additional measurements by the device 10 of the scene pixel signals for the detection and path concentration of the gas. This is shown by decision step 816. Accordingly, if additional scene pixel signal measurements are needed, the process 800 returns to step 806 (at a new subsequent time $t_S$). If no additional scene pixel signal measurements are needed, the process ends at step 818.

Note that as a result of the structure and operation of the device 10 when in the operational stage, the radiation from the blackbody source 60 (and 70 if present) is projected onto the third detector region 14c continuously over the duration for which the radiation from the scene 80 is focused onto the detector regions 14a and 14b. This is required by the process and results in the reduced frequency of shutter open and closing when in the operational stage, and in a more accurate determination and quantification of the relevant gas present in the scene.

Note that the blind pixel signal that used to correct the drift in an imaged pixel signal is typically, and preferably, the blind pixel signal associated with the blind pixel that is positioned above or below the associated imaged pixel. In other words, the blind pixel signal used to correct the drift in an imaged pixel signal is preferably the blind pixel signal associated with the detector element closest in position to the detector element associated with the imaged pixel signal. For example, as shown in FIG. 4C, the blind pixel 14c-1 is used to correct for the drift in imaged pixel 14b-1. Likewise, the blind pixel 14c-2 is used to correct for the drift in imaged pixel 14a-1.

As mentioned above, the above described processes 600, 700 and 800 were explained with reference to correcting for the drift in a single imaged pixel signal. As previously mentioned, the same processes may be performed for each of the imaged pixels signals, and may be performed in parallel. The process for correcting for the drift may be supplemented by known methods, such as, for example, NUC, in order to further reduce and correct for the effect of the signal drift. As a result of the drift correction via the processes 600, 700 and 800 described above, the supplemental NUC method is performed at a reduced frequency. The frequency of operation of the supplemental NUC method is typically in the range of once per hour to once per day.

It will be appreciated that the above descriptions are intended only to serve as examples, and that many other embodiments are possible within the scope of the present invention as defined in the appended claims.

What is claimed is:

1. A method for reducing drift induced by a changing environment feature when imaging radiation from a scene, the radiation from the scene including radiation in at least a first and a second wavelength band in the long wave infrared region of the electromagnetic spectrum, the first wavelength band including a first range of wavelengths and the second wavelength band including a second range of wavelengths different from the first range of wavelengths, the method comprising:

(a) focusing, over a duration of time, radiation from the scene by a first substantially wedge-shaped component and a second substantially wedge-shaped component through an image forming optical component onto a detector sensitive to radiation in the first and second wavelength bands, the detector being uncooled and including a separate first, second, and third detector region, the first wedge-shaped components transmitting radiation in the first wavelength band onto the first detector region, the second wedge-shaped component transmitting radiation in the second wavelength band onto the second detector region, the radiation being imaged separately onto the first and second detector regions and, the imaged radiation on the first and second detector regions producing at least a first pixel signal;

(b) projecting radiation from a radiation source by at least one of the first or second wedge-shaped components through the image forming optical component onto the third detector region to produce a second pixel signal, the radiation source different from the scene, and the radiation source projected continuously onto the third detector region over the duration of time for which the radiation from the scene is focused onto the first and second detector regions; and (c) modifying the first pixel signal based in part on a predetermined function to produce a modified pixel signal, the predetermined function defining a relationship between a change in the second pixel signal and a change in the first pixel signal induced by the changing environment feature.

2. The method of claim 1, wherein the image forming optical component and the first and second wedge-shaped components are positioned within a first enclosure volume, the method further comprising:

(d) positioning the radiation source proximate to the first enclosure volume.

3. The method of claim 1, wherein the image forming optical component and the first and second wedge-shaped components are positioned within a first enclosure volume, and at least a portion of the first enclosure volume is positioned within a second enclosure volume, the method further comprising:

(d) positioning the radiation source within the second enclosure volume and outside of the first enclosure volume.

4. The method of claim 1, further comprising:

(d) determining the change in the first pixel signal induced by the changing environment feature based on the predetermined function, and wherein the modified pixel signal is produced by subtracting the determined change in the first pixel signal from the first pixel signal.

5. The method of claim 1, wherein the predetermined function is a correlation between the second pixel signal and the change in the first pixel signal induced by the changing environment feature.

6. The method of claim 5, further comprising:

(d) determining the correlation, wherein the determining of the correlation is performed prior to performing (a).

7. The method of claim 5, wherein the radiation source is a blackbody radiation source, and the image forming optical component and the first and second wedge-shaped components are positioned within a first enclosure volume, and the detector and the first enclosure volume are positioned within a chamber having an adjustable chamber temperature, and a verification of the correlation is determined by:

(i) measuring a first temperature of the blackbody radiation source at a first chamber temperature and measuring a subsequent temperature of the blackbody radiation source at a subsequent chamber temperature, the first and subsequent temperatures of the blackbody radiation source defining a first set;

(ii) measuring a first reading of the second pixel signal at the first chamber temperature and measuring a subsequent reading of the second pixel signal at the subsequent chamber temperature, the first and subsequent readings of the pixel signal defining a second set; and (iii) verifying a correlation between the first and second sets.

8. The method of claim 5, wherein the radiation source is a blackbody radiation source, and the image forming optical component and the first and second wedge-shaped components are positioned within a first enclosure volume, and the detector and the first enclosure volume are positioned within a chamber having an adjustable chamber temperature, and a determination of the correlation includes:

(i) measuring a first reading of the first pixel signal at a first chamber temperature and measuring a subsequent reading of the first pixel signal at a subsequent chamber temperature;

(ii) subtracting the first reading of the first pixel signal from the subsequent reading of the first pixel signal to define a first set; and (iii) measuring a first reading of the second pixel signal at the first chamber temperature and measuring a subsequent reading of the second pixel signal at the subsequent chamber temperature, the first and subsequent readings of the second pixel signal defining a second set.

9. The method of claim 8, wherein the modifying of the first pixel signal includes:

(i) measuring a first reading of the first pixel signal at a first time instance and measuring a subsequent reading of the first pixel signal at a subsequent time instance;

(ii) measuring a first reading of the second pixel signal at the first time instance and measuring a subsequent reading of the second pixel signal at the subsequent time instance; and (iii) subtracting the first reading of the second pixel signal from the subsequent reading of the second pixel signal to define a third set.

10. The method of claim 9, wherein the modifying of the first pixel signal further includes:

(iv) modifying the subsequent reading of the first pixel signal based on the third set in accordance with a correlation between the first and second sets.

11. The method of claim 8, wherein the determination of the correlation further includes:

(iv) displaying the first set as a function of the second set.

12. The method of claim 8, wherein the determination of the correlation further includes:

(iv) displaying the first set as a function of a third set, the third set being defined by the first chamber temperature and the subsequent chamber temperature.

13. A device for reducing a drift induced by a changing environment feature when imaging radiation from a scene, the radiation from the scene including radiation in at least a first and a second wavelength band in the long wave infrared region of the electromagnetic spectrum, the first wavelength band including a first range of wavelengths and the second wavelength band including a second range of wavelengths different from the first range of wavelengths, the device comprising:

(a) a radiation source, the radiation source different from the scene;

(b) a detector of the radiation from the scene and of radiation from the radiation source, the detector being uncooled and sensitive to radiation in the first and second wavelength bands, and the detector including a separate first, second, and third detector region;

(c) a first and a second filter, the first filter associated with the first detector region for allowing radiation in the first wavelength band to be imaged on the first detector region, the second filter associated with the second detector region for allowing radiation in the second wavelength band to be imaged on the second detector region;

(d) an optical system for focusing the radiation from the scene onto the first and second detector regions over a duration of time, and for continuously focusing the radiation from the radiation source onto the third detector region over the duration of time for which the radiation from the scene is focused onto the detector, and for forming two images of the same scene on the first and second detector regions, the optical system comprising:

(i) an image forming optical component for forming an image of the scene on the detector and for projecting radiation from the radiation source onto the third detector region, and (ii) a first substantially wedge-shaped component and a second substantially wedge-shaped component, the first wedge-shaped component associated with the first filter, the second wedge-shaped component associated with the second filter, each of the wedge-shaped components directing radiation from a field of view of the scene through the image forming optical component onto the detector, such that the radiation from the scene is imaged separately onto the first and second detector regions, the imaged radiation on the first detector regions including radiation in the first wavelength band, and the imaged radiation on the second detector region including radiation in the second wavelength band, and at least one of the first or second wedge-shaped components projecting radiation from the radiation source through the image forming optical component onto the third detector region; and (e) electronic circuitry configured to:

(i) produce at least a first pixel signal from the imaged radiation on the first and second detector regions;

(ii) produce a second pixel signal from the radiation source projected by the optical system onto the third detector region, and (iii) modify the first pixel signal according to a predetermined function to produce a modified pixel signal, the predetermined function defining a relationship between a change in the second pixel signal and a change in the first pixel signal induced by the changing environment feature.

14. The device of claim 13, wherein the electronic circuitry is further configured to:

(iv) determine the change in the first pixel signal induced by the changing environment feature based on the predetermined function; and (v) subtract the determined change in the first pixel signal from the first pixel signal.

15. The device of claim 13, wherein the radiation source is a blackbody radiation source.

16. The device of claim 13, wherein the radiation from the radiation source is directed by only one of the first and second wedge-shaped components through the image forming optical component onto the third detector region.

17. The device of claim 13, further comprising:
    (f) a first enclosure volume, wherein the optical system is positioned within the first enclosure volume.

18. The device of claim 17, wherein the radiation source is positioned proximate to the first enclosure volume.

19. The device of claim 17, further comprising:
    (g) a second enclosure volume, wherein at least a portion of the first enclosure volume is positioned within the second enclosure volume, and the radiation source is positioned within the second enclosure volume and outside of the first enclosure volume.

* * * * *